United States Patent [19]
Wu

[11] Patent Number: 5,823,374
[45] Date of Patent: Oct. 20, 1998

[54] COLLAPSIBLE BOX FORMED WITH BAMBOO STRIPS

[76] Inventor: Jack Chieh-Yuan Wu, P. O. Box 55-846, Taipei, Taiwan

[21] Appl. No.: 848,645

[22] Filed: Apr. 29, 1997

[51] Int. Cl.⁶ ...................................................... B65D 6/20
[52] U.S. Cl. .............................................................. 217/51
[58] Field of Search ................................ 217/51, 46, 47, 217/43 R, 15, 14, 13, 12 R; 220/7, 6, 4.33, 4.28, 62

[56] References Cited

U.S. PATENT DOCUMENTS

| | | | |
|---|---|---|---|
| 373,828 | 11/1887 | Hamilton | 217/51 |
| 634,031 | 10/1899 | Rogers | 217/47 |
| 883,070 | 3/1908 | Yeomans | 217/51 |
| 1,253,490 | 1/1918 | Howland | 217/47 |
| 2,269,622 | 1/1942 | Downing | 217/47 |
| 2,419,026 | 4/1947 | Newhouse | 217/47 |
| 5,282,542 | 2/1994 | Mo | 220/7 |

FOREIGN PATENT DOCUMENTS

| | | | |
|---|---|---|---|
| 439514 | 6/1912 | France | 217/51 |
| 451 972 | 5/1913 | France | 217/51 |
| 61705 | 5/1955 | France | 217/51 |
| 1219402 | 5/1960 | France | 217/51 |
| 5015 | 7/1915 | United Kingdom | 217/47 |

*Primary Examiner*—Stephen J. Castellano

[57] ABSTRACT

A collapsible box includes: a bottom panel, a front panel, a rear panel, a left-side panel, a right-side panel and a top panel for forming a box of parallelepiped shape, each panel consisting of a plurality of bamboo strips juxtapositionally connected with one another by at least a fastening member transversely linking the bamboo strips, each panel having at least a reinforcing rib secured with the plurality of bamboo strips and each panel having a pair of opposite end portions each forming an acute angle of 45 degrees, whereby upon folding of the two neighboring panels, the two acute angles of the two neighboring reinforcing ribs will form a right angle for forming a strong stable right-angle elbow structure of the two neighboring reinforcing ribs as assembled by the two neighboring panels; and upon tying of the fastening members on an assembled box by folding the plurality of panels, the box as assembled can be strongly durably constructed for storing foods or goods therein; and upon unfolding of the panels and untying of the fastening members, the box may be unfolded and flattened to be a compact volume, convenient for transportation and re-use at a lower cost.

5 Claims, 5 Drawing Sheets

5,823,374

COLLAPSIBLE BOX FORMED WITH BAMBOO STRIPS

BACKGOUND OF THE INVENTION

A conventional wooden box is provided for storing vegetable or fruits therein to be carried in a refrigerated cargo container for shipping purpose. However, such a wooden box has the following drawbacks:

1. The wooden material may be easily corroded or decayed especially when attacked by moisture, thereby influencing the quality of the goods or foods stored in the box.

2. The wooden resource has become short for its supply around the world to increase the material cost for making the wooden box.

3. The heat transfer or conductivity of wooden material is not good to thereby affect the refrigeration efficiency when carried in a refrigerated shipping container.

4. Wood panel, when made thinner for cost and heat-transfer reasons, will weaken its mechanical strength to possibly be broken or damaged during handling and transportation therefor.

5. A conventional wooden box is made as a fixed or rigid form which can not be collapsed or folded for minimizing its volume, being inconvenient and costly for transporting the "blank" box.

The present inventor has found the drawbacks of the conventional wooden box and invented the present collapsible box formed with bamboo strips.

SUMMARY OF THE INVENTION

The object of the present invention is to provide a collapsible box including: a bottom panel, a front panel, a rear panel, a left-side panel, a right-side panel and a top panel for forming a box of parallelepiped shape, each panel consisting of a plurality of bamboo strips juxtapositionally connected with one another by at least a fastening member transversely linking the bamboo strips, each panel having at least a reinforcing rib secured with the plurality of bamboo strips and each rib having a pair of opposite end portions each end portion forming an acute angle of 45 degrees, whereby upon folding of the two neighboring panels, the two acute angles of the two neighboring reinforcing ribs will form a right angle for forming a strong stable right-angle elbow structure as assembled by the two neighboring panels; and upon tying of the fastening members on an assembled box by folding the plurality of panels, the box as assembled can be strongly durably constructed for storing foods or goods therein; and upon unfolding of the panels and untying of the fastening members, the box may be unfolded and flattened to be a compact volume, convenient for transportation and re-use at a lower cost.

DETAILED DESCRIPTION

Figure 1:
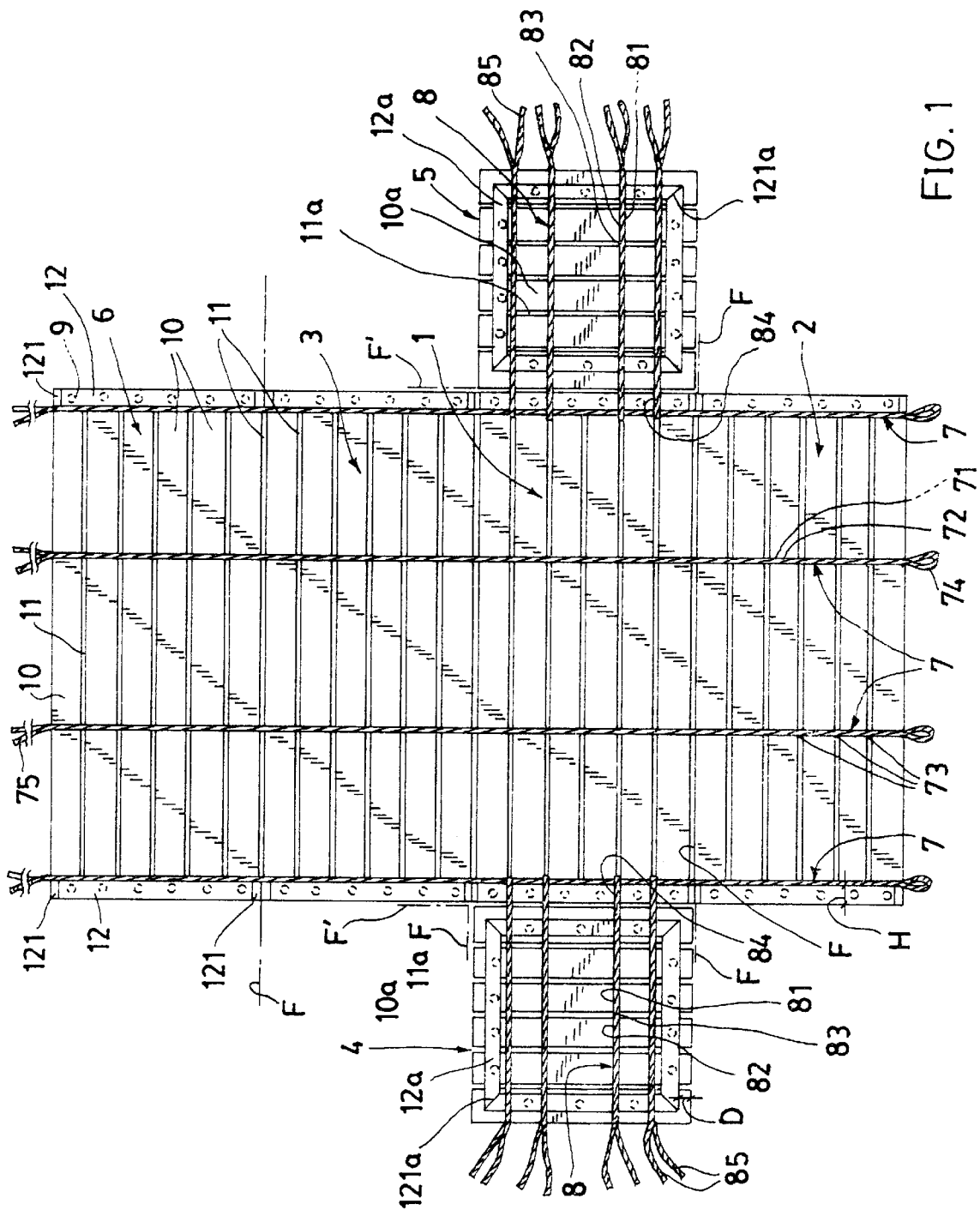
FIG. 1 is an illustration of the present invention when unfolded and flattened.
Figure 2:
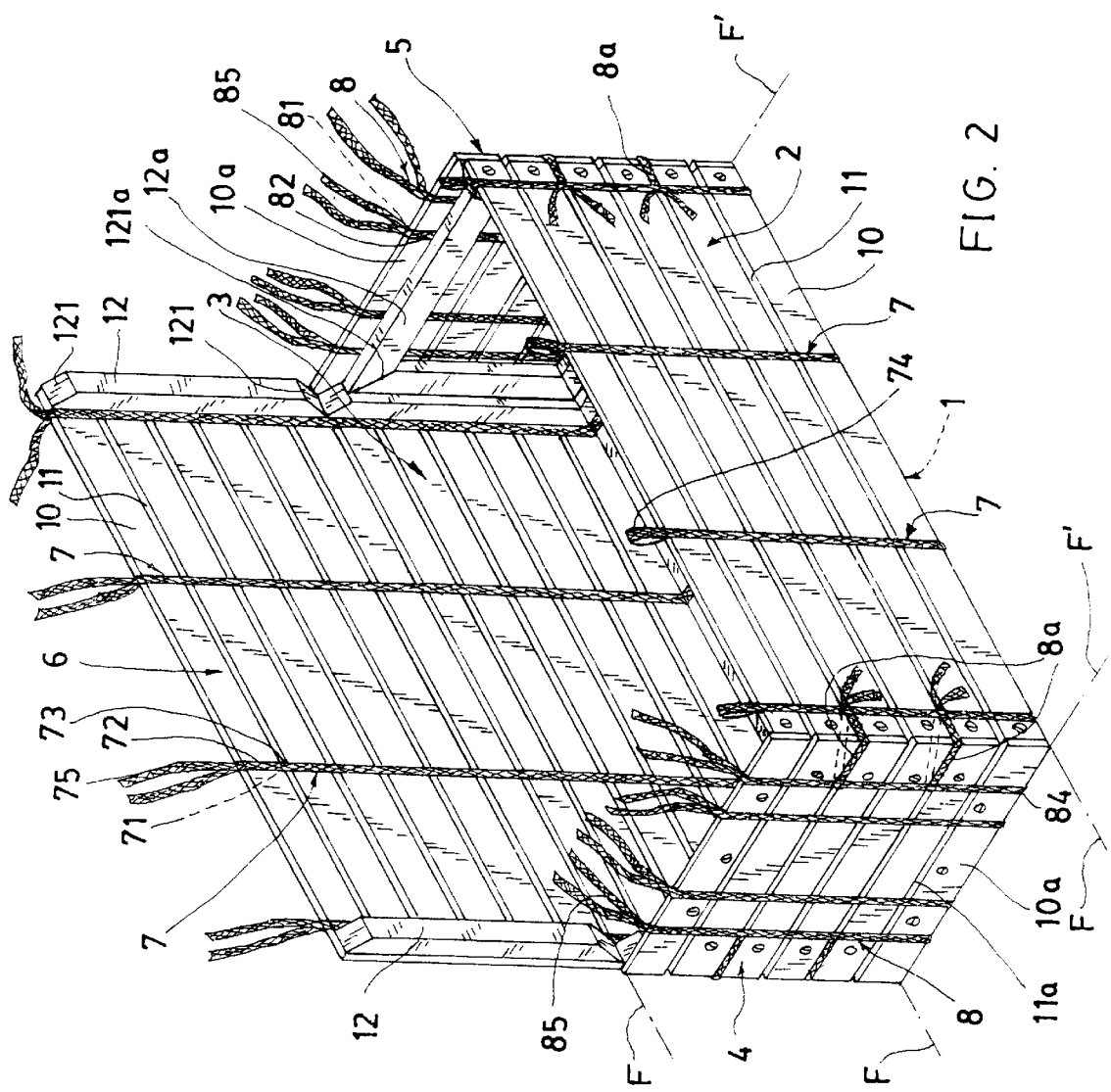
FIG. 2 shows a box of the present invention as being assembled.

As shown in FIGS. 1–5, a preferred embodiment of the present invention comprises: a bottom panel 1, a front panel 2, a rear panel 3 respectively hingedly connected to a front side and a rear side of the bottom panel 1, a left-side panel 4 hingedly connected to a left side of the bottom panel 1, a right-side panel 5 hingedly connected to a right side of the bottom panel 1, and a top panel 6 hingedly connected to the rear panel 3, whereby upon folding and assembly of the panels 1, 2, 3, 4, 5 and 6 along folding lines F, F', a box of parallelepiped shape will be formed. The top panel 6 may then form a top cover (Figure 2).

Each panel of the bottom panel 1, the front panel 2, the rear panel 3 and the top panel 6 includes: a plurality of bamboo strips 10 juxtapositionally connected by a plurality of fastening members 7, each bamboo strip 10 having a suitable thickness durable for loading goods or foods in the box 100 as assembled; a plurality of ventilation apertures 11 each aperture 11 formed between every two neighboring bamboo strips 10 for ventilation and for enterring cooling air therethrough when the box 100 is stored in a refrigerated cargo container (not shown); and at least two reinforcing ribs 12 respectively transversely secured on two opposite end portions of each panel 1, 2, 3, 6 by a plurality of screws 9 or other joining elements by fixing each screw 9 through each bamboo strip 10 into each reinforcing rib 12, with each reinforcing rib 12 perpendicular to each bamboo strip 10.

Figure 3:
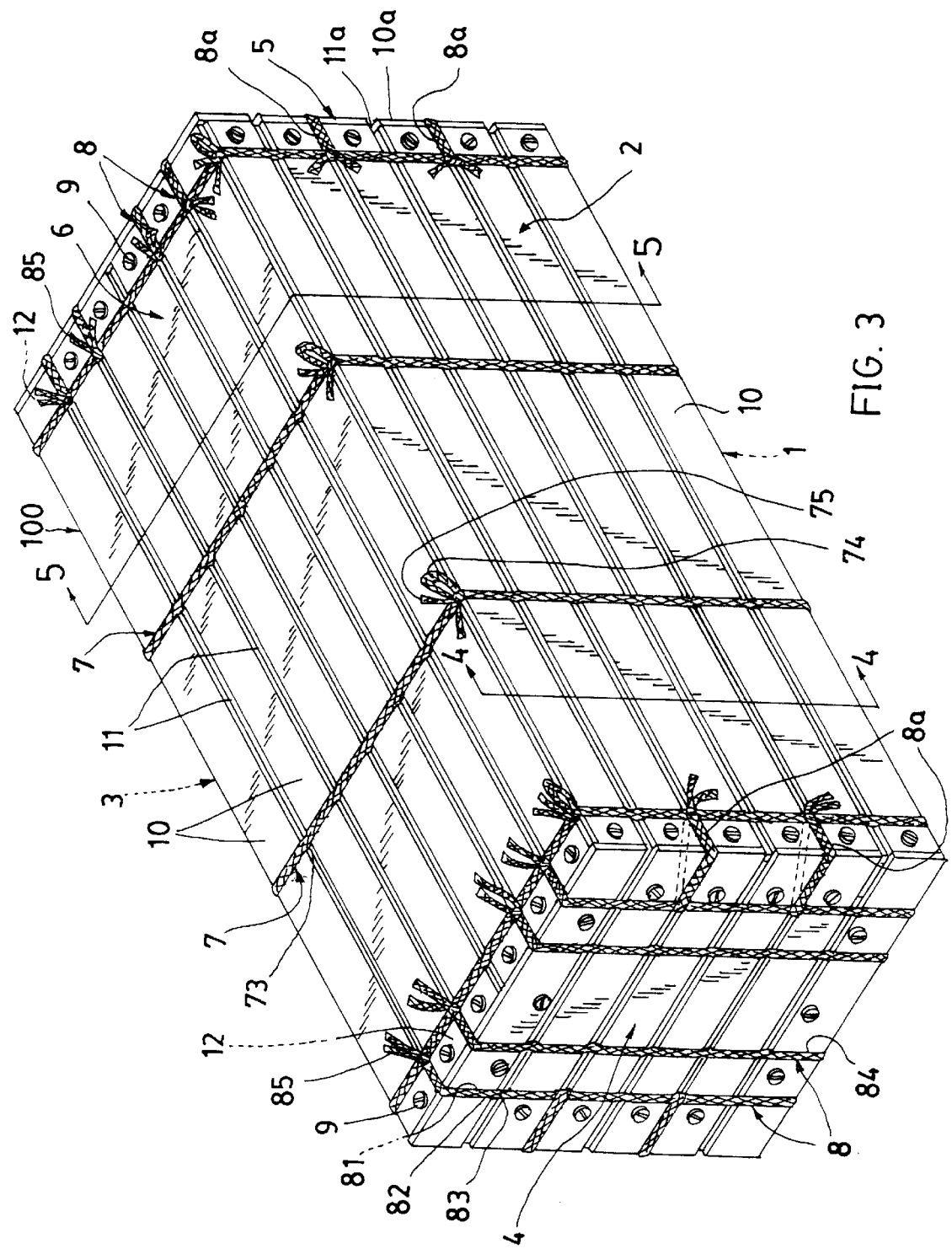
FIG. 3 shows an assembled and tied box in accordance with the present invention.

Each reinforcing rib 12 may also be made of bamboo, having a pair of acute-angle portions 121 disposed on two opposite end portions of the rib 12, each acute angle portion 121 defining 45 degrees from a bottom surface of each panel 1, 2, 3 or 6, whereby upon assembly of two neighboring panels (such as panel 1 and panel 2), the two acute-angle portions 121 of two neighboring reinforcing ribs 12 will form a right angle (FIG. 5) to form a right-angle eblow portion of the two neighboring reinforcing ribs 12 by assembling the two neighboring panels to be perpendicular to each other for a strong and stable assembled box 100 (FIG. 3).

Each fastening member 7 may be a belt, a rope, a linear strip, a wire, a cable, a band, a string, a thread or any other fastening devices made of plastic or other materials for juxtapositionally connecting the plurality of bamboo strips 10 to be a panel or a sheet, serving as a side wall of a box or of a container for storing foods or goods therein.

Figure 4:
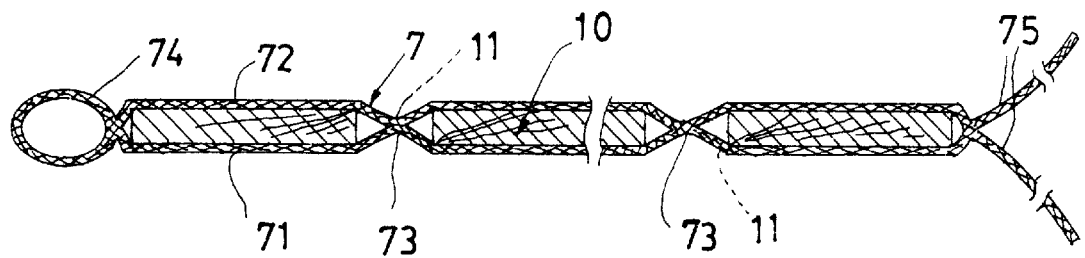
FIG. 4 is a sectional drawing showing the bamboo strips fastened by the fastening member of the present invention when viewed from 4—4 direction of FIG. 3.

The fastening member 7 as shown in FIGS. 4, 2, 1 includes: a lower belt 71, and an upper belt 72 for sandwiching each bamboo strip 10 between the lower and upper belts 71, 72 having a joining portion 73 between the two neighboring strips 10 joined together by ultrasonic welding or other joining methods applied with heat and pressure and each joining portion 73 positioned in each aperture 11 between every two neighboring bamboo strips 10, a loop portion 74 formed on a first end of the fastening member 7, and a tail portion 75 which may be bifurcated strings or other forms formed on a second end of the fastening member 7 for tying a knot with the loop portion 74 for fastening the panels together to assemble a box 100 as shown in FIG. 3.

Figure 5:
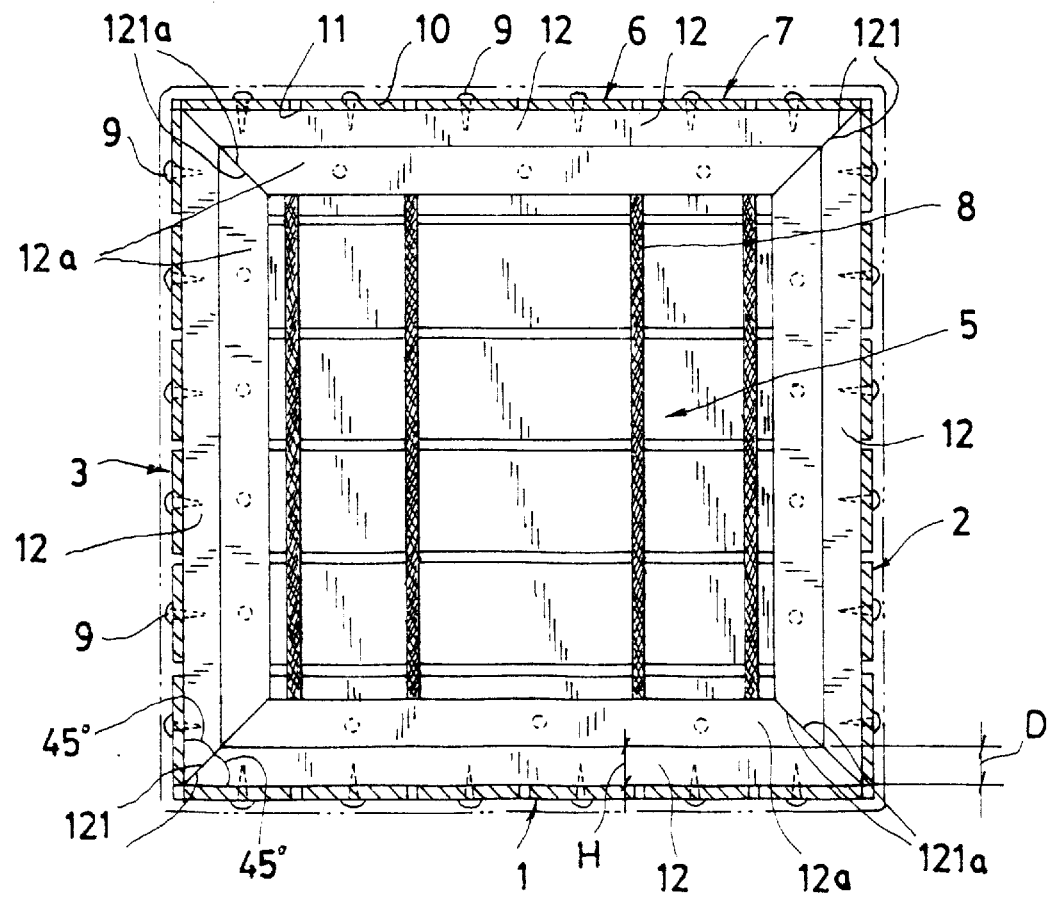
FIG. 5 is a cross sectional drawing of the present invention when viewed from 5—5 direction of FIG. 3.

Each side panel of the left-side panel 4 and the right-side panel 5 as shown in FIGS. 5, 1, 2, 3 includes: a plurality of bamboo strips 10a juxtapositionally connected by a plurality of fastening members 8; a plurality of apertures 11a each aperture 11a defined between every two neighboring bamboo strips 10a for ventilation; and four side reinforcing ribs 12a forming a rectangular frame and fixed on the side panel 4, 5 by screws 9 with each side reinforcing rib 12a separated from an outermost edge of the side panel 4, 5 at a distance D which is equal to a height H of each reinforcing rib 12 secured on the panel 1, 2, 3, 6 (as shown in FIGS. 5, 1), whereby upon assembly of a box of the present invention, the rectangular frame formed by the four side reinforcing ribs 12a in each side panel 4, 5 will be engaged with an outer rectangular frame formed by the four reinforcing ribs 12 of the four panels 1, 2, 3, 6 for a tight, coincident and snug embedding of the side reinforcing ribs 12a of the side panel 4 or 5 within the reinforcing ribs 12 of the panels 1, 2, 3, 6 (FIG. 5), thereby stabilizing and enhancing the strength of the assembled box 100 durable for loading goods or foods therein.

The fastening member 8 for fastening the bamboo strips 11a of the side panel 4, 5 includes: a lower belt 81, and an upper belt 82 for sandwiching each bamboo strip 10a between the two belts 81, 82 having a joining portion 83 joined together and positioned in each aperture 11a between every two strips 10a, a loop hinge 84 formed at a bottom portion of each side panel 4, 5 for hingedly connecting each side panel 4, 5 to the bottom panel 1, and a tail portion 85 which may be bifurcated strings and be tied on a side portion of the top panel 6 through a reinforcing rib 12 for fastening each side panel 4, 5 to the top panel 6 for assembling a box 100 as shown in FIGS. 2, 3.

For firmly fastening the side panels 4, 5 with the panels 1, 2, 3, 6, a plurality of auxiliary fastening members 8a are provided for passing through a side reinforcing rib 12a of the side panel 4, 5 and a reinforcing rib 12 of the front or rear panel 2, 3 for horizontally or latitudinally fastening a side portion of each side panel 4 or 5 to a side portion of the front panel 2 or the rear panel 3 for enhancing a better assembly of the panels of this invention.

Figure 6:
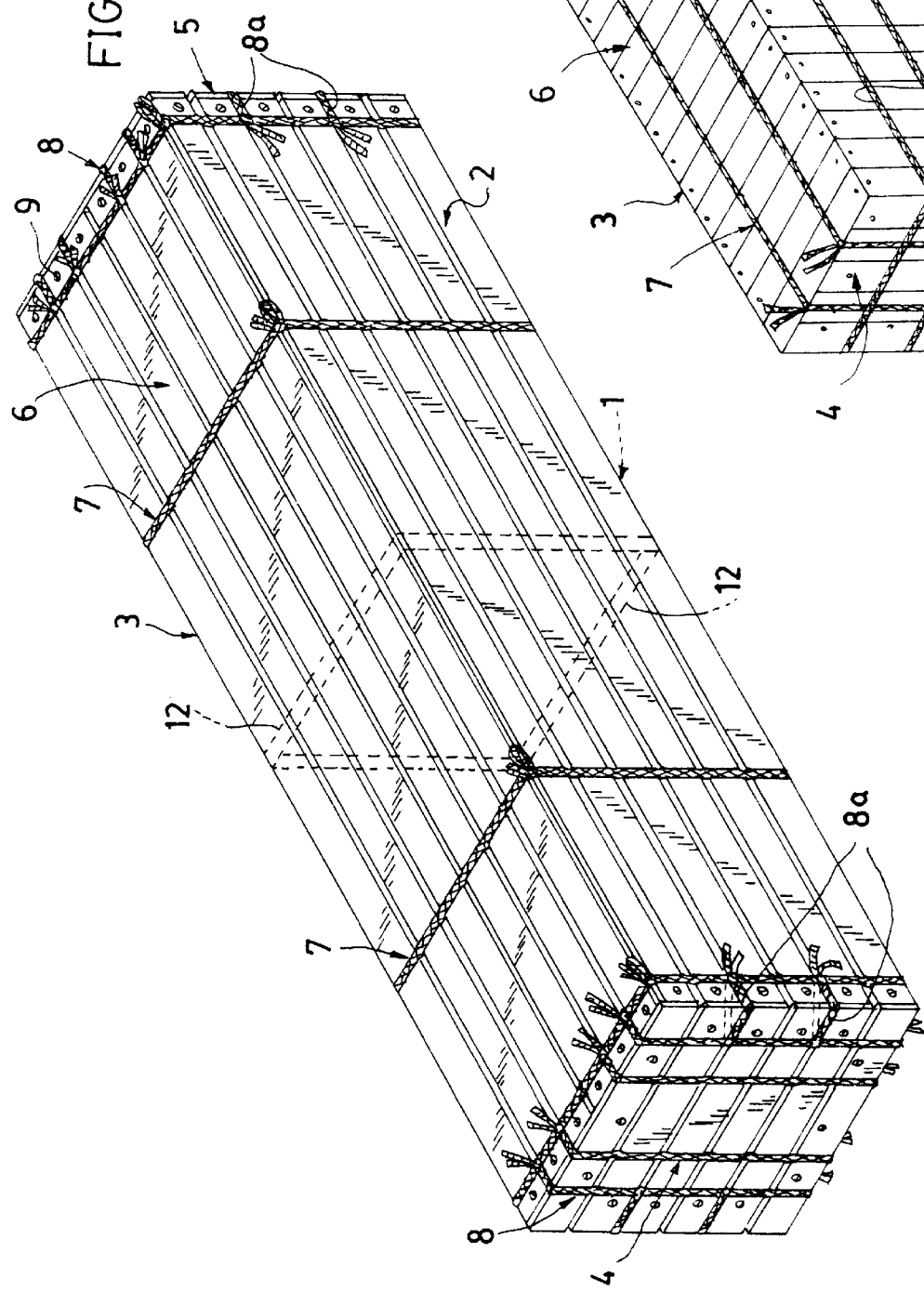
FIG. 6 shows another preferred embodiment of the present invention.

As shown in FIG. 6, at least a reinforcing rib 12 may be further secured in a middle portion of each panel 1, 2, 3, 6 for enhancing the strength of the panel and for preventing expansion or sagging of the panel when the box is made larger for loading heavier goods therein.

Figure 7:
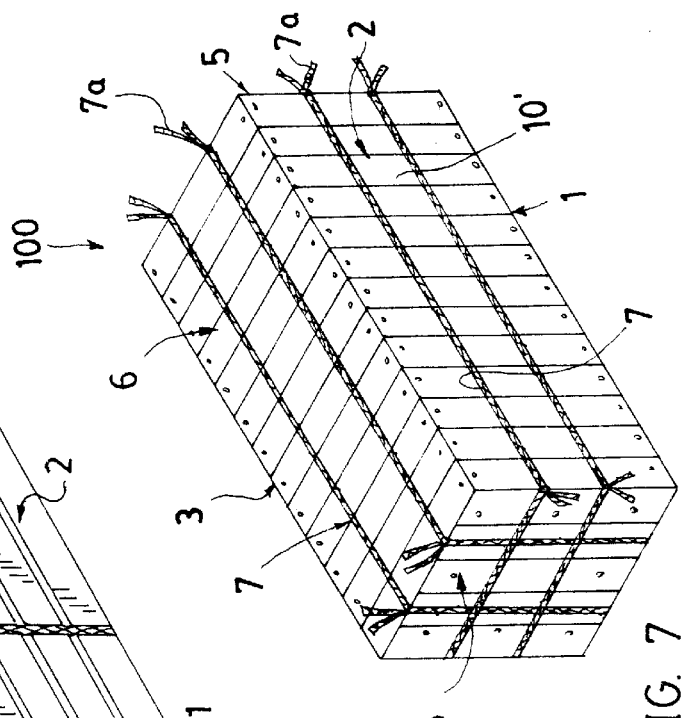
FIG. 7 shows still another preferred embodiment of the present invention.

As shown in FIG. 7, the bamboo strips 10' may be vertically or longitudinally juxtapositionally fastened to form the box panels 1, 2, 3, 4, 5 and 6 to form another preferred embodiment of the present invention (the strip 10' being perpendicular to the strip 10 as shown in FIG. 3). After folding the panels, the fastening members 7 may be tied one another (7a) for firmly assembling the box 100.

The present invention is superior to a conventional wooden box with the following advantages:

1. The bamboo can be grown up rapidly and quickly harvested than wood, thereby decreasing the production cost and saving natural resources, beneficial for global environmental protection.

2. The bamboo strip even made thinner has a better strength than that of wood. The bamoboo may well resist weather and moisture attack than wood. So, the box made by bamboo rather than wood will have a better mechanical and physical properties than that made of wooden material.

3. The bamboo strips 10, 10a provide better ventilation in the apertures 11, 11a in each panel for enhancing a refrigeration effect when carrying foods or vegetables in the box within a refrigerated cargo container. The bamboo has a better thermal conductivity than that of wood to thereby increase the heat-exchange efficiency for well refrigerating the goods as loaded in the box of the present invention.

4. The box can be easily unfolded and flattened to be a compact unit with minimized volume for easier transportation and re-uses. Once folding the panels, the fastening members 7, 8, 8a are tied to quickly assemble a box convenient for storage and shipping uses. So, this invention provides a box with low-cost, easier assembly and unfolding, convenient. handling and re-use, better than that made of wooden material.

The present invention may be modified without departing from the spirit and scope of this invention. The shape of the box, the orientations of the bamboo strips, the choices of the fastening member, the joining methods of ribs, and so on may be otherwise modified, not limited in the present invention. The panel of this invention may also be designated as sheet, wall (side wall), and the others.

I claim:

1. A collapsible box comprising:

a bottom panel (1), a front panel (2), and a rear panel (3) respectively hingedly connected to a front side and a rear side of the bottom panel (1), a left-side panel (4) hingedly connected to a left side of the bottom panel (1), a right-side panel (5) hingedly connected to a right side of the bottom panel (1), and a top panel (6) hingedly connected to the rear panel (3), whereby upon folding and assembly of said panels (1, 2, 3, 4, 5 and 6), a box of parallelepiped shape is formed;

each said panel of the bottom panel (1), the front panel (2), the rear panel (3) and the top panel (6) including: a plurality of bamboo strips (10) juxtapositionally connected by a plurality of fastening members (7), a plurality of ventilation apertures (11) formed in each said panel each said aperture (11) formed between every two neighboring bamboo strips (10) for ventilation, and at least two reinforcing ribs (12) respectively transversely secured on two opposite end portions of each said panel (1, 2, 3, 6) by a plurality of joining elements (9), each said reinforcing rib (12) perpendicular to each said bamboo strip (10); and each said reinforcing rib (12) having a pair of acute-angle portions (121) disposed on two opposite end portions of each said rib (12), each said acute angle portion (121) defining 45 degrees from a bottom surface of each said panel (1, 2, 3, 6), whereby upon assembly of two said panels neighboring each other, the two acute-angle portions (121) of two neighboring reinforcing ribs (12) will form a right angle to form a right-angle eblow portion of the two neighboring reinforcing ribs by assembling the two said panels to be perpendicular to each other; whereby upon folding of said bottom, front, rear, and top panels, a pair of rectangular frames each consisting of four said reinforcibg ribs (12) are formed in a left and right side of said box for forming a strong and stable box when further assembled with said right-side and left-side panels;

each said fastening member (7) including: a lower belt (71), and an upper belt (72) for sandwiching each said bamboo strip (10) between the lower and upper belts (71, 72) having a joining portion (73) of each said belt (71, 72) between two neighboring bamboo strips (10) joined together and each said joining portion (73) positioned in each said aperture (11) between the two neighboring bamboo strips (10), a loop portion (74) formed on a first end of the fastening member (7), and a tail portion (75) formed on a second end of the fastening member (7) for tying a knot with the loop portion (74) for fastening said panels (1, 2, 3, 6) together in order to assemble a box; and each said side panel of the left-side panel (4) and the right-side panel (5) including: a plurality of bamboo strips (10a) juxtapositionally connected by a plurality of fastening members (8); a plurality of apertures (11a) formed in each said side panel, each said aperture (11a) defined between every two neighboring bamboo strips (10a) for ventilation; and four side reinforcing ribs (12a) forming an inner rectangular frame and fixed on each said side panel (4, 5) by screws (9) with each said side reinforcing rib (12a) separated from an outermost edge of each said side panel (4, 5) at a distance (D) which is equal to a height (H) of each said reinforcing rib (12) secured on each said panel of said bottom, front, rear and top panels (1, 2, 3, 6), whereby upon assembly of a box, the inner rectangular frame formed by the four side reinforcing ribs (12a) in each said side panel (4, 5) will be engaged within an outer rectangular frame formed by the four reinforcing ribs (12) of the bottom, front, rear and top panels (1, 2, 3, 6) for a tight and stable assembly of the box.

2. A collapsible box according to claim 1, wherein said upper and lower belts (72, 71) are made of plastic material, and joined by heat and pressure.

3. A collapsible box according to claim 1, wherein each said fastening member (8) for fastening the bamboo strips (10a) of the side panel (4, 5) includes: a lower belt (81), and an upper belt (82) for sandwiching each said bamboo strip (10a) between the said two belts (81, 82) having a joining portion (83) of each said belt between two neighboring strips (10a) joined together and positioned in each said aperture (11a) between every two said strips (10a), a loop hinge (84) formed at a bottom portion of each said side panel (4, 5) for hingedly connecting each said side panel (4, 5) to the bottom panel (1), and a tail portion (85) for fastening each said side panel (4, 5) to the top panel (6) for assembling a box.

4. A collapsible box according to claim 3, wherein said tail portion (85) of said fastening member (8) on said side panel (4, 5) is formed as bifurcated strings tied to the top panel (6) for assembling a box.

5. (amended)A collapsible box according to claim 1, wherein each said side panel (4, 5) further includes: a plurality of auxiliary fastening members (8a) provided for passing through a side reinforcing rib (12a) of the side panel (4, 5) and a reinforcing rib (12) of the front and rear panels (2, 3) for latitudinally fastening a side portion of each said side panel (4, 5) to a side portion of the front panel (2) and the rear panel (3) for enhancing a better fastening of said panels.

\* \* \* \* \*